US011412525B1

United States Patent
Chen et al.

(10) Patent No.: US 11,412,525 B1
(45) Date of Patent: Aug. 9, 2022

(54) RESOURCE ALLOCATION FOR SUPPORTING SERVICE DIFFERENTIATION IN DYNAMIC SPECTRUM SHARING (DSS) DEPLOYMENTS

(71) Applicant: AT&T Intellectual Property I, L.P., Atlanta, GA (US)

(72) Inventors: Alan Chen, Austin, TX (US); Ye Chen, Marietta, GA (US); Erik Holmberg, Kirkland, WA (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/244,401

(22) Filed: Apr. 29, 2021

Related U.S. Application Data

(60) Provisional application No. 63/176,611, filed on Apr. 19, 2021.

(51) Int. Cl.

| | |
|---|---|
| *H04W 72/12* | (2009.01) |
| *H04W 16/14* | (2009.01) |
| *H04W 28/08* | (2009.01) |
| *H04W 28/16* | (2009.01) |
| *H04W 28/26* | (2009.01) |
| *H04W 16/04* | (2009.01) |

(52) U.S. Cl.
CPC ....... *H04W 72/1215* (2013.01); *H04W 16/14* (2013.01); *H04W 28/0819* (2020.05); *H04W 28/0967* (2020.05)

(58) Field of Classification Search
CPC . H04W 28/0268; H04W 24/02; H04W 28/08; H04W 88/10; H04W 72/0453;
(Continued)

(56) References Cited

U.S. PATENT DOCUMENTS 8,285,298 B2 * 10/2012 Noriega ............ H04W 72/1236
455/418
9,445,278 B2 * 9/2016 Sadek ................... H04W 16/14
(Continued)

FOREIGN PATENT DOCUMENTS

KR 20220013248 A * 2/2022
WO WO-2020226644 A1 * 11/2020
(Continued)

OTHER PUBLICATIONS

Ong et. al., Radio Resource Managementof Composite Wireless Networks: Predictive and Reactive Approaches, IIEEE Transactions on Mobile Computing, vol. 11, No. 5, May 2012, pp. 807-820.*

*Primary Examiner* — Ahmed Elallam
(74) *Attorney, Agent, or Firm* — Guntin & Gust, PLC; Matthew Tropper

(57) ABSTRACT

Aspects of the subject disclosure may include, for example, obtaining a first set of traffic load measurements associated with current traffic of a first RAT and a second set of traffic load measurements associated with current traffic of a second RAT, determining a respective weighted traffic load for each QoS level in a first set of QoS levels associated with the first RAT and for each QoS level in a second set of QoS levels associated with the second RAT, deriving a resource allocation ratio for the first and second RATs, and performing a resource allocation based on the resource allocation ratio to enable relative scheduling weights assigned to the QoS levels in the first set of QoS levels and the second set of QoS levels to be reflected in first RAT traffic and second RAT traffic over a DSS spectrum. Other embodiments are disclosed.

20 Claims, 8 Drawing Sheets

(58) Field of Classification Search
CPC . H04W 72/1215; H04W 24/08; H04W 72/04; H04W 28/02; H04W 28/0819; H04W 28/0958; H04W 72/12; H04W 16/14; H04W 28/0967; H04W 16/10; H04W 28/0231; H04W 28/0236; H04W 28/0284
See application file for complete search history.

(56) References Cited

U.S. PATENT DOCUMENTS

| | | | | |
|---|---|---|---|---|
| 9,578,517 | B2* | 2/2017 | De Pasquale | H04W 16/14 |
| 9,872,308 | B2* | 1/2018 | Arnott | H04W 72/0453 |
| 10,028,212 | B2* | 7/2018 | Griot | H04W 24/02 |
| 10,129,895 | B2* | 11/2018 | Kim | H04W 28/0268 |
| 10,849,180 | B2* | 11/2020 | Karimli | H04W 28/0268 |
| 11,019,534 | B2* | 5/2021 | Garcia-Saavedra | H04L 5/0007 |
| 11,019,633 | B2* | 5/2021 | Kwok | H04W 72/0486 |
| 2021/0235277 | A1* | 7/2021 | Parekh | H04W 16/10 |
| 2021/0235473 | A1* | 7/2021 | Parekh | H04W 72/044 |
| 2021/0329466 | A1* | 10/2021 | Khasnabish | H04W 48/18 |
| 2021/0400497 | A1* | 12/2021 | Zhou | H04W 16/14 |
| 2022/0070845 | A1* | 3/2022 | Stauffer | H04W 72/046 |

FOREIGN PATENT DOCUMENTS

| | | | |
|---|---|---|---|
| WO | WO-2021002866 | A1 * | 1/2021 |
| WO | WO-2021246925 | A1 * | 12/2021 |

\* cited by examiner

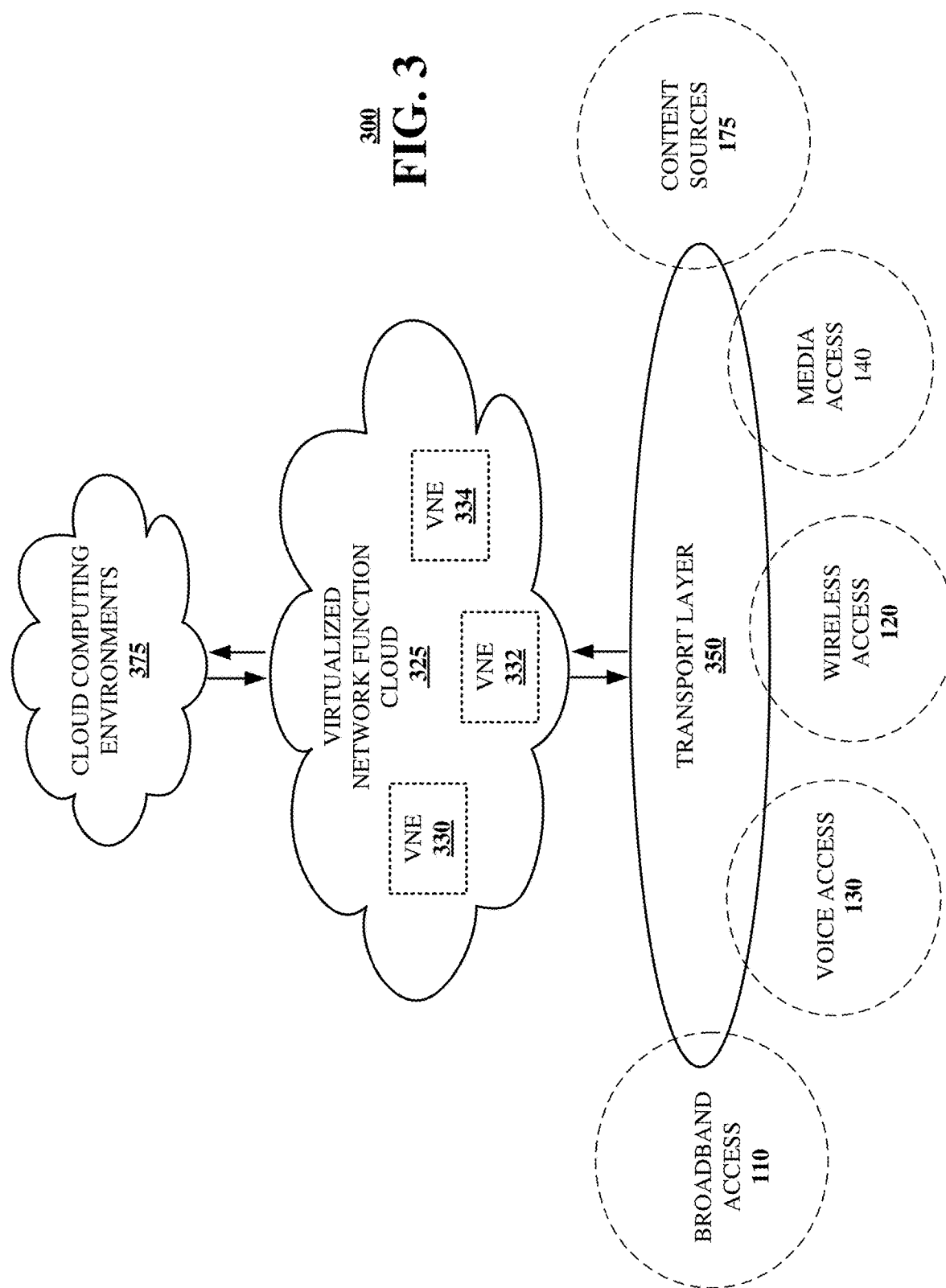

US 11,412,525 B1

RESOURCE ALLOCATION FOR SUPPORTING SERVICE DIFFERENTIATION IN DYNAMIC SPECTRUM SHARING (DSS) DEPLOYMENTS

CROSS-REFERENCE TO RELATED APPLICATION(S)

This application claims priority to U.S. Provisional Ser. No. 63/176,611, filed Apr. 19, 2021. The contents of the foregoing are hereby incorporated by reference into this application as if set forth herein in full.

FIELD OF THE DISCLOSURE

The subject disclosure relates to resource allocation for supporting service differentiation in dynamic spectrum sharing (DSS) deployments.

BACKGROUND

Radio access technologies (RATs) employ service quality-related mechanisms to ensure that different types of bearer traffic are allocated appropriate network resources. For example, 4G Long Term Evolution (LTE) networks perform priority scheduling of bearer traffic based on service quality levels/priorities/types—i.e., Quality-of-Service (QoS) Class Identifiers (QCIs), where different bearer traffic that require different qualities of service are associated with different QCI values. 3rd Generation Partnership Project (3GPP) standards define QCIs 1 through 9 that each has a different priority and is associated with a particular type of service and corresponding delay budgeting, packet error loss rate, latency, transmission speed, transmission frequency, and/or the like. Certain of the QCIs may be used for bearer traffic that requires guaranteed service parameters—i.e., a Guaranteed Bit Rate (GBR). For bearer traffic associated with any of these QCIs, the radio access network (RAN), such as an eNodeB, may reserve network resources for transporting such bearer traffic. The remaining QCIs—i.e., non-GBR QCIs—may be used for other types of traffic, where allocation of resources therefor is on a "best effort" basis, with no guaranteed bit rates. 4G LTE networks (e.g., where a "clean" LTE band transports only LTE-based traffic) support relative priority scheduling among non-GBR QCIs. This enables service performance for bearer traffic associated with different non-GBR QCIs to be differentiated (e.g., during network congestion) and allows wireless service providers to market different mobility plans (e.g., multiple tiers of service) by mapping different traffic onto different non-GBR QCIs.

With technological advances and growing data consumption demands, network providers have migrated existing network technology to support next generation RAT(s). For example, network providers have migrated 4G LTE band(s) to support 5G New Radio (NR). For smooth migration in which (e.g., legacy) LTE services remain supported on the band, network providers have adopted Dynamic Spectrum Sharing (DSS) as a key enabler, which dynamically allocates/splits network resources between both LTE and 5G NR and thus enables services of both technologies to share a single spectrum.

5G NR networks similarly perform priority scheduling of bearer traffic based on QoS priorities/levels/types—i.e., 5G QoS Identifiers (5QIs). Both non-GBR flows and GBR flows are supported in 5G NR. 3GPP standards provide a mapping from 5QI to QoS characteristics, where there is generally a one-to-one, corresponding mapping to QCIs of 4G LTE (e.g., QCIs 1 through 9). As with 4G LTE networks, 5G NR networks similarly support relative priority scheduling among non-GBR 5QIs, which enables service performance for bearer traffic associated with different non-GBR 5QIs to be differentiated (e.g., during network congestion) and allows wireless service providers to market different mobility plans (e.g., multiple tiers of service) by mapping different traffic onto different non-GBR 5QIs.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communications network in accordance with various aspects described herein.

DETAILED DESCRIPTION

Figure 1:
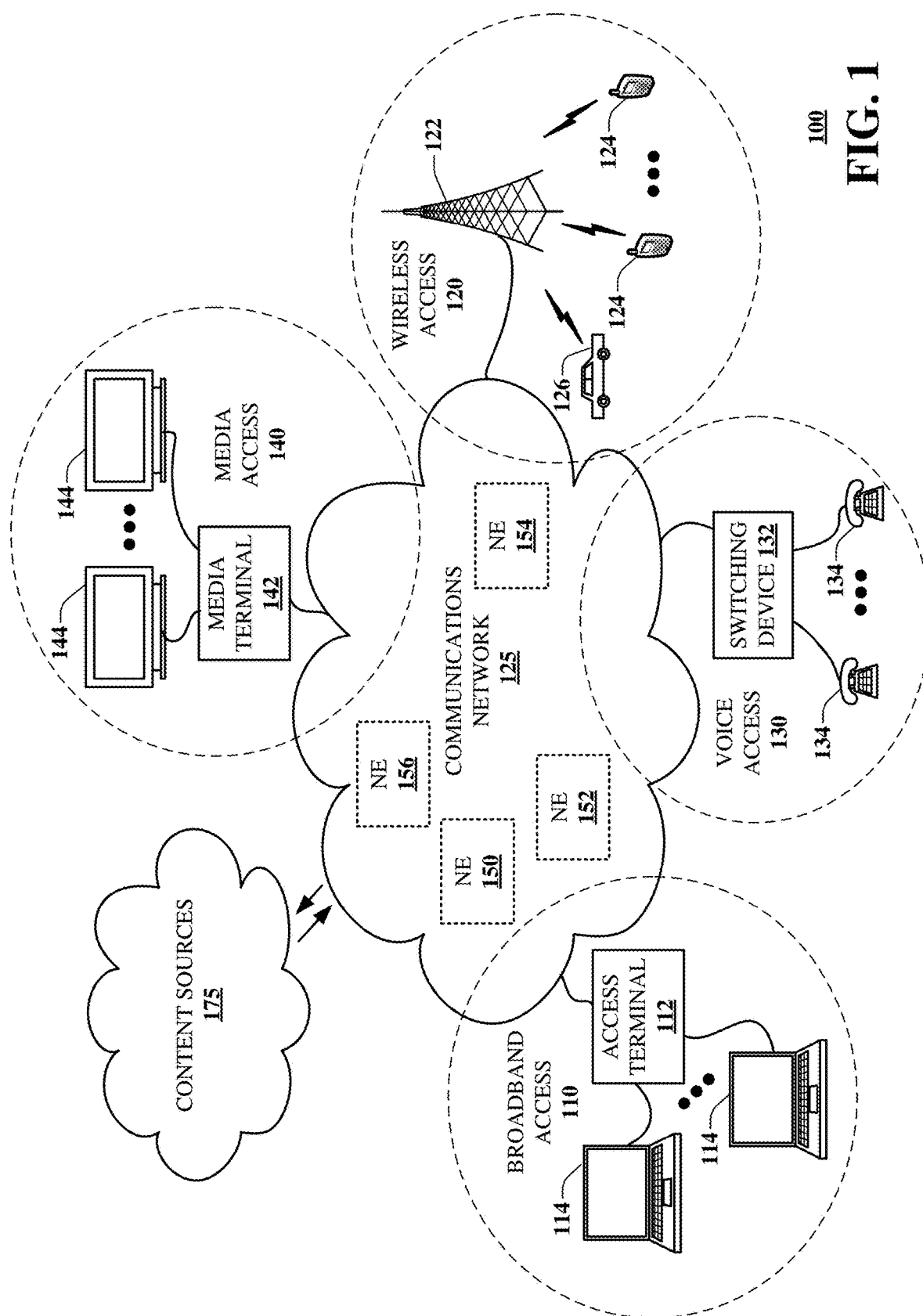
FIG. 1 is a block diagram illustrating an exemplary, non-limiting embodiment of a communications network in accordance with various aspects described herein.

A wireless service provider may leverage (e.g., some frequency bands of) a network of an existing RAT to support a new RAT, by adopting DSS, which allows for dynamic allocation of network resources between the two RATs such that services of both RATs can share a single spectrum. This enables the wireless service provider to leverage limited, available spectrum resources for the new RAT. In such DSS deployments, where two RATs share a DSS band, service quality-based priority scheduling for bearer traffic is performed independently for each of the RATs. For instance, in a DSS deployment where LTE and 5G NR traffic share a DSS band, an LTE-based relative scheduler manages resource allocation for LTE-related traffic based on priorities of non-GBR QCIs (which, e.g., may be based on resources that remain after GBR QCI bearer traffic has been served), and an independent 5G NR-based relative scheduler manages resource allocation for 5G NR-related traffic based on priorities of non-GBR 5QIs (which, e.g., may be based on resources that remain after GBR 5QI bearer traffic has been served). Such independent priority scheduling over a shared DSS band has limits, since it does not support service differentiation between the two RATs.

To demonstrate, suppose that, for a first RAT, such as LTE or LTE link of 5G NR Non-Standalone (NSA), service differentiation requirements for non-GBR QCIs 6 through 9 are prioritized as follows:
  a) non-GBR LTE $QCI_6$ being associated with a high priority service offered by a service provider and assigned a priority or scheduling weight of 32;
  b) non-GBR LTE $QCI_7$ being associated with a top-tier of a commercial service plan offered by the service provider and assigned a scheduling weight of 16;
  c) non-GBR LTE $QCI_8$ being associated with a mid-tier of the commercial service plan and assigned a scheduling weight of 8; and
  d) non-GBR LTE $QCI_9$ being associated with a low-tier of the commercial service plan and assigned a scheduling weight of 1.

Here, the LTE-based relative scheduler may achieve service differentiation for LTE-based traffic by proportionally allocating resources based on the various scheduling weights assigned to the QCIs 6 through 9. So, as an example, in a case where there is network congestion, and where there is non-GBR LTE $QCI_8$ bearer traffic to be served and non-GBR LTE $QCI_9$ bearer traffic to be served, the LTE-based relative scheduler may, based upon determining that there are insufficient resources to serve all bearer traffic, allocate resources for the non-GBR LTE $QCI_8$ bearer traffic and the non-GBR LTE $QCI_9$ bearer traffic based on the corresponding scheduling weights of 8 and 1—i.e., based on a ratio of 8-to-1. In this way, assuming that all other conditions are equal, throughput for the non-GBR LTE $QCI_8$ bearer traffic should be eight times that of the non-GBR LTE $QCI_9$ bearer traffic.

Suppose also that, for a second RAT, such as 5G NR Standalone (SA) or NR link of 5G NR NSA, service differentiation requirements for non-GBR 5QIs 6 through 9 are similarly prioritized as follows:
  a) non-GBR NR $5QI_6$ being associated with the high priority service offered by the service provider and assigned a priority or scheduling weight of 32;
  b) non-GBR NR $5QI_7$ being associated with the top-tier of the commercial service plan offered by the service provider and assigned a scheduling weight of 16;
  c) non-GBR NR $5QI_8$ being associated with the mid-tier of the commercial service plan and assigned a scheduling weight of 8; and
  d) non-GBR NR $5QI_9$ being associated with the low-tier of the commercial service plan and assigned a scheduling weight of 1.

The 5G NR-based relative scheduler may, independent of the LTE-based relative scheduler, similarly achieve service differentiation for 5G NR-based traffic by proportionally allocating resources based on the various scheduling weights assigned to the 5QIs 6 through 9. So, as an example, in a case where there is network congestion, and where there is non-GBR NR $5QI_6$ bearer traffic to be served and non-GBR NR $5QI_7$ bearer traffic to be served, the 5G NR-based relative scheduler may, based upon determining that there are insufficient resources to serve all bearer traffic, allocate resources for the non-GBR NR $5QI_6$ bearer traffic and the non-GBR NR $5QI_7$ bearer traffic based on the corresponding scheduling weights of 32 and 16—i.e., based on a ratio of 32:16 or 2-to-1. In this way, assuming that all other conditions are equal, throughput for the non-GBR NR $5QI_6$ bearer traffic should be twice that of the non-GBR NR $5QI_7$ bearer traffic.

Radio access network (RAN) implementations might perform resource allocation amongst two RATs in a DSS deployment based on a fixed ratio (e.g., 1-to-1, 3-to-1, etc.) or based on traffic load measurements for the two RATs. The latter method takes into account bearer traffic loads corresponding to all QCIs or 5QIs, for example, to determine how resources are to be allocated amongst the two RATs. However, by running the relative schedulers of the two RATs independently, as discussed above, each of the relative schedulers merely sub-allocates the resources that have been allocated for its corresponding RAT, which leaves open the possibility that certain higher priority bearer traffic for one RAT (e.g., non-GBR $5QI_6$ bearer traffic at a scheduling weight of 32) may have a lower throughput than lower priority bearer traffic for the other RAT (e.g., non-GBR $QCI_8$ bearer traffic at a scheduling weight of 8), and thus result in undesired service impacts. For example, in a case where a larger proportion of network resources is allocated for LTE than for 5G NR (e.g., whether based on a fixed ratio or based on current traffic load measurements for LTE and 5G NR), it might be possible that higher priority 5G NR bearer traffic for one RAT, such as non-GBR $5QI_6$ bearer traffic at a scheduling weight of 32, will have a lower throughput than lower priority LTE bearer traffic, such as non-GBR $QCI_8$ bearer traffic at a scheduling weight of 8.

The subject disclosure describes, among other things, illustrative embodiments of a resource allocation platform that is capable of performing resource allocation for different RATs (e.g., two RATs, such as 4G LTE and 5G NR), in a DSS deployment, based on weighted traffic load measurements. In exemplary embodiments, the resource allocation platform may obtain traffic load measurements from respective relative schedulers associated with the different RATs, determine, for each of the RATs, a weighted traffic load for each non-GBR QoS or service quality level (e.g., non-GBR QCI, non-GBR 5QI, or the like) of that RAT based on a scheduling weight assigned for that non-GBR QoS or service quality level, and derive a resource allocation ratio for the different RATs in accordance with the determined weighted traffic loads. In various embodiments, the resource allocation platform may allocate network resources to the respective relative schedulers, based on the resource allocation ratio, which enables the respective relative schedulers to sub-allocate such network resources to different bearer traffic based on the corresponding scheduling weights.

Embodiments of the resource allocation platform provide for fair services differentiation by enabling relative priorities of service types of multiple RATs to be maintained on a shared DSS band between, or across all of, the RATs. Implementation of the resource allocation platform also ensures that the throughput of higher priority services (e.g., premium services or the like) of one RAT on a shared DSS band is not lower than the throughput of lower priority services (e.g., basic services or the like) of another RAT on the shared DSS band.

One or more aspects of the subject disclosure include a device, comprising a processing system of a communications network including a processor, wherein the communications network employs a first radio access technology (RAT) and a second RAT and is configured with dynamic spectrum sharing (DSS) such that first traffic relating to the first RAT and second traffic relating to the second RAT share a particular spectrum, wherein the first RAT is associated with a first set of quality-of-service (QoS) levels, and wherein the second RAT is associated with a second set of QoS levels. The device further comprises a memory that stores executable instructions that, when executed by the processing system, facilitate performance of operations. The operations can include obtaining a first set of traffic load measurements associated with current traffic relating to the first RAT and a second set of traffic load measurements associated with current traffic relating to the second RAT. Further, the operations can include responsive to the obtaining the first set of traffic load measurements and the second set of traffic load measurements, determining a respective weighted traffic load for each QoS level in the first set of QoS levels and the second set of QoS levels, and based on the determining, deriving a resource allocation ratio for the first RAT and the second RAT. Further, the operations can include performing a resource allocation in accordance with the resource allocation ratio to enable relative scheduling weights assigned to the QoS levels in the first set of QoS levels and the second set of QoS levels to be reflected in the first traffic and the second traffic over the particular spectrum.

One or more aspects of the subject disclosure include a non-transitory machine-readable medium, comprising executable instructions that, when executed by a processing system associated with a first radio access technology (RAT) employed by a communications network including a processor, facilitate performance of operations. The operations can include obtaining a first set of traffic load measurements associated with the first RAT, wherein the communications network employs a second RAT and is configured with dynamic spectrum sharing (DSS) such that first traffic associated with the first RAT and second traffic associated with the second RAT share a DSS band, wherein the first RAT is associated with a first plurality of quality-of-service (QoS) levels, wherein the second RAT is associated with a second plurality of QoS levels, and wherein QoS levels of the first plurality of QoS levels and the second plurality of QoS levels are assigned respective scheduling weights. Further, the operations can include providing the first set of traffic load measurements to a resource allocation platform to enable the resource allocation platform to determine a respective weighted traffic load for each QoS level of the first plurality of QoS levels and to derive a resource allocation ratio for the first RAT and the second RAT based at least in part on the respective weighted traffic load for each QoS level of the first plurality of QoS levels, and responsive to the providing the first set of traffic load measurements to the resource allocation platform, receiving a particular allocation of resources from the resource allocation platform, wherein the particular allocation of resources is determined based on the resource allocation ratio for the first RAT and the second RAT. Further, the operations can include sub-allocating the particular allocation of resources to bearer traffic associated with the first plurality of QoS levels.

One or more aspects of the subject disclosure include a method. The method can comprise receiving, by a processing system including a processor, and from a first network node relating to a first radio access technology (RAT) of a communications network, a first set of traffic load measurements associated with first traffic relating to the first RAT, wherein the first RAT is associated with a first set of non-Guaranteed Bit Rate (non-GBR) quality-of-service (QoS) levels. Further, the method can include receiving, by the processing system, and from a second network node relating to a second RAT of the communications network, a second set of traffic load measurements associated with second traffic relating to the second RAT, wherein the communications network is configured with dynamic spectrum sharing (DSS) such that the first traffic and the second traffic share a radio frequency (RF) spectrum, and wherein the second RAT is associated with a second set of non-GBR QoS levels. Further, the method can include, responsive to the receiving the first set of traffic load measurements and the receiving the second set of traffic load measurements, calculating, by the processing system, a respective weighted traffic load for each non-GBR QoS level in the first set of non-GBR QoS levels and the second set of non-GBR QoS levels, and determining, by the processing system, a resource allocation ratio for the first RAT and the second RAT based on the calculating. Further, the method can include allocating, by the processing system, resources of the communications network in accordance with the resource allocation ratio to enable first throughputs associated with the first traffic and second throughputs associated with the second traffic to remain proportional to relative scheduling weights associated with the non-GBR QoS levels in the first set of non-GBR QoS levels and the second set of non-GBR QoS levels.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, resource allocation for different RATs in a DSS deployment based on weighted traffic load measurements. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
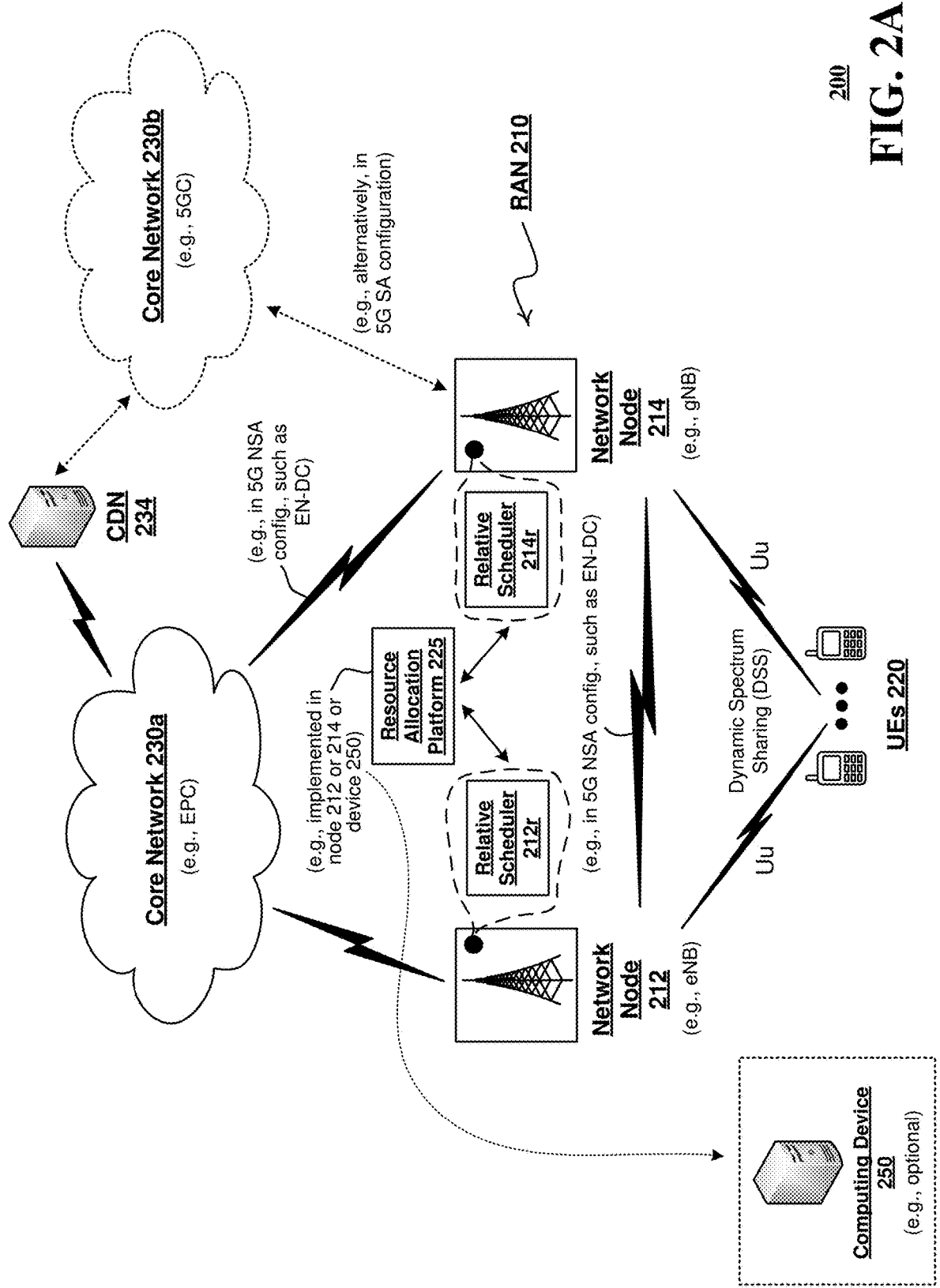
FIG. 2A is a block diagram illustrating an example, non-limiting embodiment of a system functioning within, or operatively overlaid upon, the communications network of FIG. 1 in accordance with various aspects described herein.

Referring now to FIG. 2A, a block diagram is shown illustrating an example non-limiting embodiment of a communications network (or system) 200 functioning within or in conjunction with the system 100 of FIG. 1 in accordance with various aspects described herein. Communications network 200 can include a RAN 210 that includes one or more network nodes (e.g., access points, such as base stations or the like). As depicted in FIG. 2A, the RAN 210 can include a network node 212 and a network node 214. In various embodiments, the network node 212 and the network node 214 can employ different RATs. For example, the network node 212 may be an eNodeB or the like that employs LTE technology, and the network node 214 may be a gNodeB or the like that employs 5G NR technology. In certain embodiments, the network nodes 212 and 214 may be co-located or reside in a common structure (e.g., the same chassis or the like) or may be implemented or reside in separate devices.

In exemplary embodiments, the communications network 200 can be configured with DSS in which bearer traffic associated with the network node 212 and the network node 214 share the same frequency band. In some embodiments, a logical cell associated with the network node 212 and a logical cell associated with the network node 214 may share the same physical resources on RAN 210 hardware and the same spectrum on a radio frequency (RF) link. It is to be appreciated and understood that the communications network 200 can include any number/types of network nodes and/or any various types of heterogeneous cell configurations with various quantities of cells and/or types of cells.

In various embodiments, each of network node 212 and the network node 214 can include a radio resource control (RRC) entity capable of exchanging network traffic (e.g., protocol data units (PDUs)) with various user equipment (UEs) 220. A UE 220 can be equipped with transmitter (Tx) device(s) and/or receiver (Rx) device(s) configured to communicate with, and utilize network resources provided via, the network node 212 and/or the network node 214.

One or more of the network nodes 212, 214 of the RAN 210 can be in communication with one or more mobility core network(s) via one or more backhaul network(s). In certain embodiments, the communications network 200 can be configured to provide dual connectivity according to an E-UTRAN New Radio (NR) Dual Connectivity (EN-DC) configuration. In such embodiments, the EN-DC configuration can provide a 5G Non-Standalone (NSA) implementation. For example (related to a 5G NSA implementation), an eNodeB (e.g., the network node 212) and an evolved packet core (EPC) (e.g., a core network 230a) can be utilized as an anchor for mobility management and coverage for an additional 5G (or NR) carrier. Network traffic can be split in a variety of manners, such as across LTE and NR at the eNodeB, at the core network 230a, and/or at an NR cell (e.g., associated with the network node 214). In alternate embodiments, the communications network 200 can provide a 5G Standalone (SA) implementation. In such embodiments, the network node 214, for example, can be in communication with a core network 230b (e.g., a 5G core (5GC)).

A core network, such as each of the core networks 230a and 230b, can be in further communication with one or more other networks (e.g., one or more content delivery networks (CDNs) (one of which, CDN 234, is shown)), one or more services, and/or one or more devices. One or more of the core networks 230a and 230b can include various network devices and/or systems that provide a variety of functions. Examples of functions facilitated or provided by a core network can include an access mobility and management function (AMF) configured to facilitate mobility management in a control plane of the communications network 200; a User Plane Function (UPF) configured to provide access to a data network, such as a packet data network (PDN), in a user (or data) plane of the communications network 200; a Unified Data Management (UDM) function; a Session Management Function (SMF); a Policy Control Function (PCF); and/or the like. In various embodiments, a core network may include one or more devices implementing other functions, such as a master user database server device for network access management, a PDN gateway server device for facilitating access to a PDN, and/or the like.

Figure 2B:
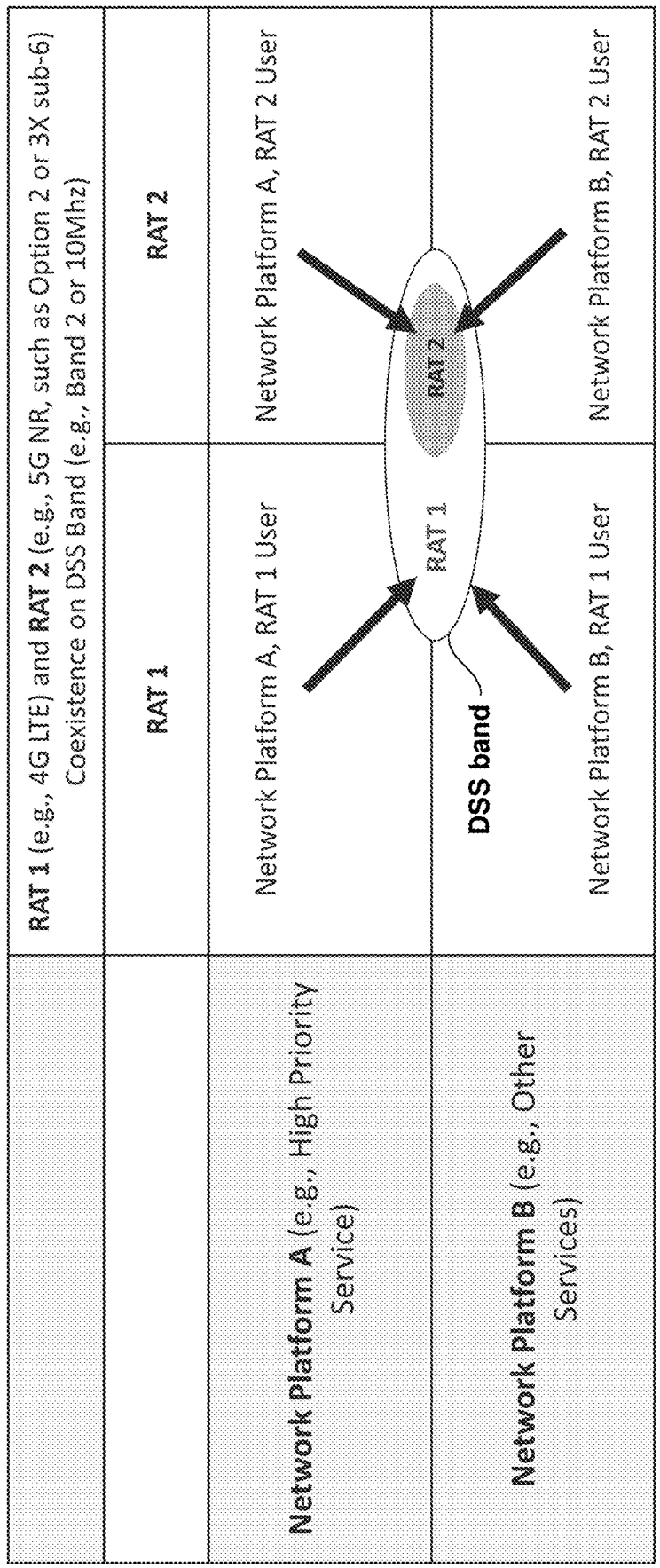
FIG. 2B is a block diagram illustrating a representational diagram of an example network implementation using dynamic spectrum sharing (DSS) and for which embodiments of the system of FIG. 2A may be used, in accordance with various aspects described herein.

As depicted in FIG. 2A, the network node 212 may include, or be associated with, a relative scheduler 212r. In various embodiments, the relative scheduler 212r may be configured to facilitate service differentiation for bearer traffic by proportionally allocating network resources (e.g., resources of the communications network 200, such as access to device(s) or component(s) of the communications network 200, time-based blocks of the spectrum, frequency-based blocks of the spectrum, and so on) based on scheduling weights assigned to different QoS or service quality priorities/levels/types. For example, in a case where the network node 212 is an eNodeB, the relative scheduler 212r may be configured to facilitate service differentiation for bearer traffic by proportionally allocating network resources based on scheduling weights assigned to certain non-GBR QCIs (e.g., non-GBR QCIs 6 through 9). Continuing the example, the certain non-GBR QCIs may be assigned respective scheduling weights as follows:

a) non-GBR LTE $QCI_6$ being associated with a high priority service offered by a service provider (e.g., provided via a network platform A over a RAT 1, as shown in representational diagram 255 of FIG. 2B) and assigned a priority or scheduling weight of 32;

b) non-GBR LTE QCI$_7$ being associated with a top-tier of a commercial service plan offered by the service provider (e.g., provided via a network platform B using the RAT 1, as shown in representational diagram 255 of FIG. 2B) and assigned a scheduling weight of 16;

c) non-GBR LTE QCI$_8$ being associated with a mid-tier of the commercial service plan and assigned a scheduling weight of 8; and d) non-GBR LTE QCI$_9$ being associated with a low-tier of the commercial service plan and assigned a scheduling weight of 1.

Further continuing the example, in a case where there is non-GBR LTE QCI$_8$ bearer traffic to be served and non-GBR LTE QCI$_9$ bearer traffic to be served, the relative scheduler 212r may, based upon determining that there are insufficient resources to serve all bearer traffic, allocate resources for the non-GBR LTE QCI$_8$ bearer traffic and the non-GBR LTE QCI$_9$ bearer traffic based on the corresponding scheduling weights of 8 and 1—i.e., based on a ratio of 8-to-1. In this way, assuming that all other conditions are equal, throughput for the non-GBR LTE QCI$_8$ bearer traffic should be eight times that of the non-GBR LTE QCI$_9$ bearer traffic.

As also depicted in FIG. 2A, the network node 214 may similarly include, or be associated with, a relative scheduler 214r. In various embodiments, the relative scheduler 214r may be configured to facilitate service differentiation for bearer traffic by proportionally allocating network resources based on scheduling weights assigned to different QoS or service quality priorities/levels/types. For example, in a case where the network node 214 is an gNodeB, the relative scheduler 214r may be configured to facilitate service differentiation for bearer traffic by proportionally allocating network resources based on scheduling weights assigned to certain non-GBR NR 5QIs (e.g., non-GBR NR 5QIs 6 through 9). Continuing the example, the certain non-GBR NR 5QIs may be assigned respective scheduling weights as follows:

a) non-GBR NR 5QI$_6$ being associated with the high priority service offered by the service provider (e.g., provided via the network platform A over the RAT 2, as shown in representational diagram 255 of FIG. 2B) and assigned a priority or scheduling weight of 32;

b) non-GBR NR 5QI$_7$ being associated with the top-tier of the commercial service plan offered by the service provider (e.g., provided via the network platform B using the RAT 2, as shown in representational diagram 255 of FIG. 2B) and assigned a scheduling weight of 16;

c) non-GBR NR 5QIs being associated with the mid-tier of the commercial service plan and assigned a scheduling weight of 8; and d) non-GBR NR 5QI$_9$ being associated with the low-tier of the commercial service plan and assigned a scheduling weight of 1.

Further continuing the example, in a case where there is non-GBR NR 5QI$_6$ bearer traffic to be served and non-GBR NR 5QI$_7$ bearer traffic to be served, the relative scheduler 214r may, based upon determining that there are insufficient resources to serve all bearer traffic, allocate resources for the non-GBR NR 5QI$_6$ bearer traffic and the non-GBR NR 5QI$_7$ bearer traffic based on the corresponding scheduling weights of 32 and 16—i.e., based on a ratio of 32:16 or 2-to-1. In this way, assuming that all other conditions are equal, throughput for the non-GBR NR 5QI$_6$ bearer traffic should be twice that of the non-GBR NR 5QI$_7$ bearer traffic.

As shown in FIG. 2A, the communications network 200 may include a resource allocation platform 225. In various embodiments, the resource allocation platform 225 may be capable of performing resource allocation for different RATs (e.g., two RATs, such as 4G LTE associated with the network node 212 and 5G NR associated with the network node 214), in a DSS deployment, based on weighted traffic load measurements. In exemplary embodiments, the resource allocation platform 225 may be communicatively coupled to the relative schedulers 212r and 214r, and configured to obtain traffic load measurements from the relative schedulers 212r and 214r. In various embodiments, traffic load may be measured based on data provided by the network nodes 212 and 214. For example, the network node 212 may provide, to the relative scheduler 212r, information regarding current traffic conditions or load of LTE-based traffic on the DSS band, and the network node 214 may similarly provide, to the relative scheduler 214r, information regarding current traffic conditions or load of 5G NR-based traffic on the DSS band. Traffic load can, for example, be measured in data size (e.g., kilobytes (KB), megabytes (MB), gigabytes (GB), or the like) over a unit time.

In exemplary embodiments, the resource allocation platform 225 may determine, for each of the RATs, a weighted traffic load for each non-GBR QoS or service quality level (e.g., non-GBR QCI, non-GBR 5QI, or the like) of that RAT based on a scheduling weight assigned for that non-GBR QoS or service quality level, and derive a resource allocation ratio for the different RATs in accordance with the determined weighted traffic loads. In various embodiments, the resource allocation platform 225 may not utilize the traffic loads associated with GBR QoS or service quality levels in the determination of the weighted traffic loads. For instance, in the above-described examples where non-GBR LTE QCI$_6$ through non-GBR LTE QCI$_9$ are assigned scheduling weights of 32, 16, 8, and 1, respectively, and where non-GBR NR 5QI$_6$ through non-GBR NR 5QI$_9$ are assigned scheduling weights of 32, 16, 8, and 1, respectively, the resource allocation platform 225 may calculate a total traffic load L for the first RAT (e.g., LTE) as follows:

$$L=(W_6 \times L_6)+(W_7 \times L_7) \pm (W_8 \times L_8)+(W_9 \times L_9),$$

where $W_6$ is the scheduling weight for non-GBR LTE QCI$_6$ (i.e., 32), where $W_7$ is the scheduling weight for non-GBR LTE QCI$_7$ (i.e., 16), where $W_8$ is the scheduling weight for non-GBR LTE QCI$_8$ (i.e., 8), where $W_9$ is the scheduling weight for non-GBR LTE QCI$_9$ (i.e., 1), and $L_6$ through $L_9$ are measured traffic loads associated with non-GBR LTE QCI$_6$ through non-GBR LTE QCI$_9$, respectively.

Similarly, the resource allocation platform 225 may calculate a total traffic load N for the second RAT (e.g., 5G NR) as follows:

$$N=(W_6' \times N_6)+(W_7' \times N_7)+(W_8' \times N_8)+(W_9' \times N_9),$$

where $W_6'$ is the scheduling weight for non-GBR NR 5QI$_6$ (i.e., 32), where $W_7'$ is the scheduling weight for non-GBR NR 5QI$_7$ (i.e., 16), where $W_8'$ is the scheduling weight for non-GBR NR 5QI$_8$ (i.e., 8), where $W_9'$ is the scheduling weight for non-GBR NR 5QI$_9$ (i.e., 1), and $N_6$ through $N_9$ are measured traffic loads associated with non-GBR NR 5QI$_6$ through non-GBR NR 5QI$_9$, respectively.

As an example, in a case where measured traffic load $L_6$ is determined to be 100, where each of measured traffic loads $L_7$, $L_8$, and $L_9$ is 0, where measured traffic load $N_9$ is 100, and where each of measured traffic loads $N_6$, $N_7$, and $N_8$ is 0, the resource allocation platform 225 may calculate the resource allocation ratio L:N as (32×100):(1×100)=32:1.

As another example, in a case where measured traffic load $L_8$ is determined to be 100, where each of measured traffic loads $L_6$, $L_7$, and $L_9$ is 0, where measured traffic load $N_8$ is 100, and where each of measured traffic loads $N_6$, $N_7$, and $N_9$ is 0, the resource allocation platform 225 may calculate the resource allocation ratio L:N as (8×100):(8×100)=1:1.

As a further example, in a case where measured traffic load $L_6$ is determined to be 100, where each of measured traffic loads $L_7$, $L_8$, and $L_9$ is 0, where measured traffic load $N_8$ is 100, and where each of measured traffic loads $N_6$, $N_7$, and $N_9$ is 0, the resource allocation platform 225 may calculate the resource allocation ratio L:N as (32×100):(8×100)=32:8 or 4-to-1.

In exemplary embodiments, the resource allocation platform 225 may use the resource allocation ratio L:N to allocate respective network resources to (e.g., between or amongst) each of the relative schedulers 212r and 214r. As measured traffic loads associated with the non-GBR LTE $QCI_6$ through non-GBR LTE $QCI_9$ and non-GBR NR $5QI_6$ through non-GBR NR $5QI_9$ change, the resource allocation platform 225 may dynamically allocate network resources between the different RATs. Performing resource allocation in this manner enables sufficient amounts of network resources to be allocated for the independent relative schedulers 212r and 214r to sub-allocate for the various non-GBR QoS or service quality priorities/levels/types in proportion to their corresponding scheduling weights (and based on current traffic loads associated with the various non-GBR QoS or service quality priorities/levels/types). This supports service differentiation in DSS deployments, where multiple RATs share the same RF spectrum/resources, which enables a service provider to meet service-related contractual obligations or provide mobility service differentiations in accordance with multi-tier plans or the like.

In some instances, a service quality priority/level/type may be configured with a minimal bit rate (MBR). A MBR configuration may be similar to GBR, but where admission control may not be involved and thus the minimal bit rate may not be guaranteed, and the RAN (e.g., the RAN 210) may not reserve network resources to particularly serve that MBR.

In various embodiments, the total weighted traffic load calculations, described above, may not include or involve any loads associated with MBR that may be configured for a non-GBR QoS or service quality priority/level/type. In some embodiments, the resource allocation platform 225, the relative scheduler 212r, and/or the relative scheduler 214r may determine resource allocation and/or allocate resources in accordance with weighted traffic loads for non-GBR QoS or service quality priorities/levels/types, as described above, in addition to determining resource allocation or in addition to allocating resources based on GBR or MBR. For example, in some embodiments, the resource allocation platform 225, the relative scheduler 212r, and/or the relative scheduler 214r may factor in any MBR configured for a non-GBR QoS or service quality priority/level/type when determining resource allocation and/or allocating resources in accordance with scheduling weights. For example, in a case where non-GBR LTE $QCI_6$ for the network platform A of FIG. 2B is configured with an MBR (e.g., 300 KB/s, 2 MB/s, and/or the like), the resource allocation platform 225 and/or the relative scheduler 212r may serve non-GBR LTE $QCI_6$ traffic in accordance with the MBR, and then allocate any remaining available resources proportionally to scheduling weights associated with non-GBR LTE $QCI_6$ and other non-GBR LTE QCIs. In this way, traffic associated with a non-GBR QoS or service quality priority/level/type configured with MBR may have higher priority over other traffic associated with non-GBR QoS or service quality priorities/levels/types that are not configured with MBR.

As shown in FIG. 2A, the communications network 200 can (e.g., optionally) include a computing device 250. The computing device 250 can include one or more devices, such as server device(s), configured to provide one or more functions or capabilities relating to resource allocation. In various embodiments, the resource allocation platform 225 may be implemented in the computing device 250. In some embodiments, the computing device 250 can additionally, or alternatively, provide dual connectivity control functions, edge computing functions and/or capabilities, provisioning of data and/or services for user equipment (e.g., such as UEs 220), data analytics function(s), machine learning and/or artificial intelligence function(s) that provide resource management capabilities (e.g., mobility management, admission control, interference management, etc.), automatic planning functions, configuration functions, optimization functions, diagnostic functions, healing functions, and/or the like. For example, in some implementations, the computing device 250 can include, or be implemented in, a multi-access edge computing (MEC) device or device(s), a RAN Intelligent Controller (RIC), a Self-Organizing Network (SON), and/or the like. In some embodiments, such as in a case where the core network 230a includes an EPC, the computing device 250 can include, or be implemented in, a Mobility Management Entity (MME), a Serving Gateway (SGW), and/or the like.

It is to be appreciated and understood that, while embodiments of the resource allocation platform 225 are described herein as relating to certain RATs, such as 4G LTE and 5G NR technologies, various embodiments of the resource allocation platform 225 may be applied for other RATs in a DSS deployment and/or other associated QoS or service quality priorities/levels/types. Further, although various examples described herein involve certain scheduling weights (e.g., 32, 16, 8, and 1), other scheduling weights can be assigned to different QoS or service quality priorities/levels/types.

It is also to be appreciated and understood that the quantity and arrangement of network nodes, devices, schedulers, platforms, user equipment, and networks shown in FIG. 2A are provided as an example. In practice, there may be additional network nodes, devices, schedulers, platforms, user equipment, and/or networks, different network nodes, devices, schedulers, platforms, user equipment, and/or networks than those shown in FIG. 2A. For example, the communications network 200 can include more or fewer network nodes, devices, schedulers, platforms, user equipment, and/or networks. Furthermore, two or more network nodes, devices, schedulers, platforms, user equipment, and/or networks shown in FIG. 2A may be implemented within a single network node, device, scheduler, platform, user equipment, or network shown in FIG. 2A or a single network node, device, scheduler, platform, user equipment, or network shown in FIG. 2A may be implemented as multiple, distributed network nodes, devices, schedulers, platforms, user equipment, or networks. Additionally, or alternatively, a set of network nodes, devices, schedulers, platforms, user equipment, and/or networks (e.g., one or more network nodes, devices, schedulers, platforms, user equipment, and/or networks) of the communications network 200 may perform one or more functions described as being performed by another set of network nodes, devices, schedulers, platforms, user equipment, and/or networks of the communications network 200.

Figure 2C:
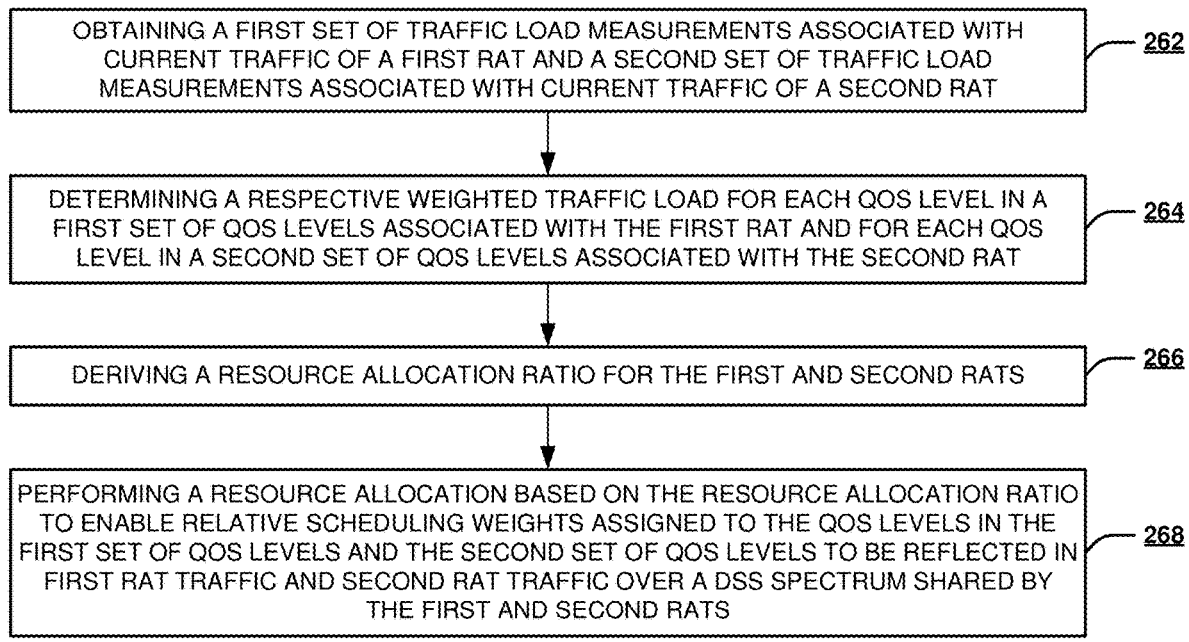
FIG. 2C depicts an illustrative embodiment of a method in accordance with various aspects described herein.

FIG. 2C depicts an illustrative embodiment of a method 260 in accordance with various aspects described herein. In some embodiments, one or more process blocks of FIG. 2C can be performed by a resource allocation platform, such as the resource allocation platform 225. In some embodiments, one or more process blocks of FIG. 2C may be performed by another device or a group of devices separate from or including the resource allocation platform 225, such as the RAN 210, the network node 212, the relative scheduler 212*r*, the network node 214, the relative scheduler 214*r*, a UE 220, the core network 230*a*, the core network 230*b*, the CDN 234, and/or the computing device 250.

At 262, the method can include obtaining a first set of traffic load measurements associated with current traffic of a first RAT and a second set of traffic load measurements associated with current traffic of a second RAT. For example, the resource allocation platform 225 can obtain a first set of traffic load measurements associated with current traffic of a first RAT and a second set of traffic load measurements associated with current traffic of a second RAT in a manner similar to that described above with respect to the communications network 200 of FIG. 2A.

At 264, the method can include determining a respective weighted traffic load for each QoS level in a first set of QoS levels associated with the first RAT and for each QoS level in a second set of QoS levels associated with the second RAT. For example, the resource allocation platform 225 can determine a respective weighted traffic load for each QoS level in a first set of QoS levels associated with the first RAT and for each QoS level in a second set of QoS levels associated with the second RAT in a manner similar to that described above with respect to the communications network 200 of FIG. 2A.

At 266, the method can include deriving a resource allocation ratio for the first and second RATs. For example, the resource allocation platform 225 can derive a resource allocation ratio for the first and second RATs in a manner similar to that described above with respect to the communications network 200 of FIG. 2A.

At 268, the method can include performing a resource allocation based on the resource allocation ratio to enable relative scheduling weights assigned to the QoS levels in the first set of QoS levels and the second set of QoS levels to be reflected in first RAT traffic and second RAT traffic over a DSS spectrum shared by the first and second RATs. For example, the resource allocation platform 225 can perform a resource allocation based on the resource allocation ratio to enable relative scheduling weights assigned to the QoS levels in the first set of QoS levels and the second set of QoS levels to be reflected in first RAT traffic and second RAT traffic over a DSS spectrum shared by the first and second RATs in a manner similar to that described above with respect to the communications network 200 of FIG. 2A.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of communications network 200, and method 260 presented in FIGS. 1, 2A, and 2C. For example, virtualized communications network 300 can facilitate, in whole or in part, resource allocation for different RATs in a DSS deployment based on weighted traffic load measurements.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
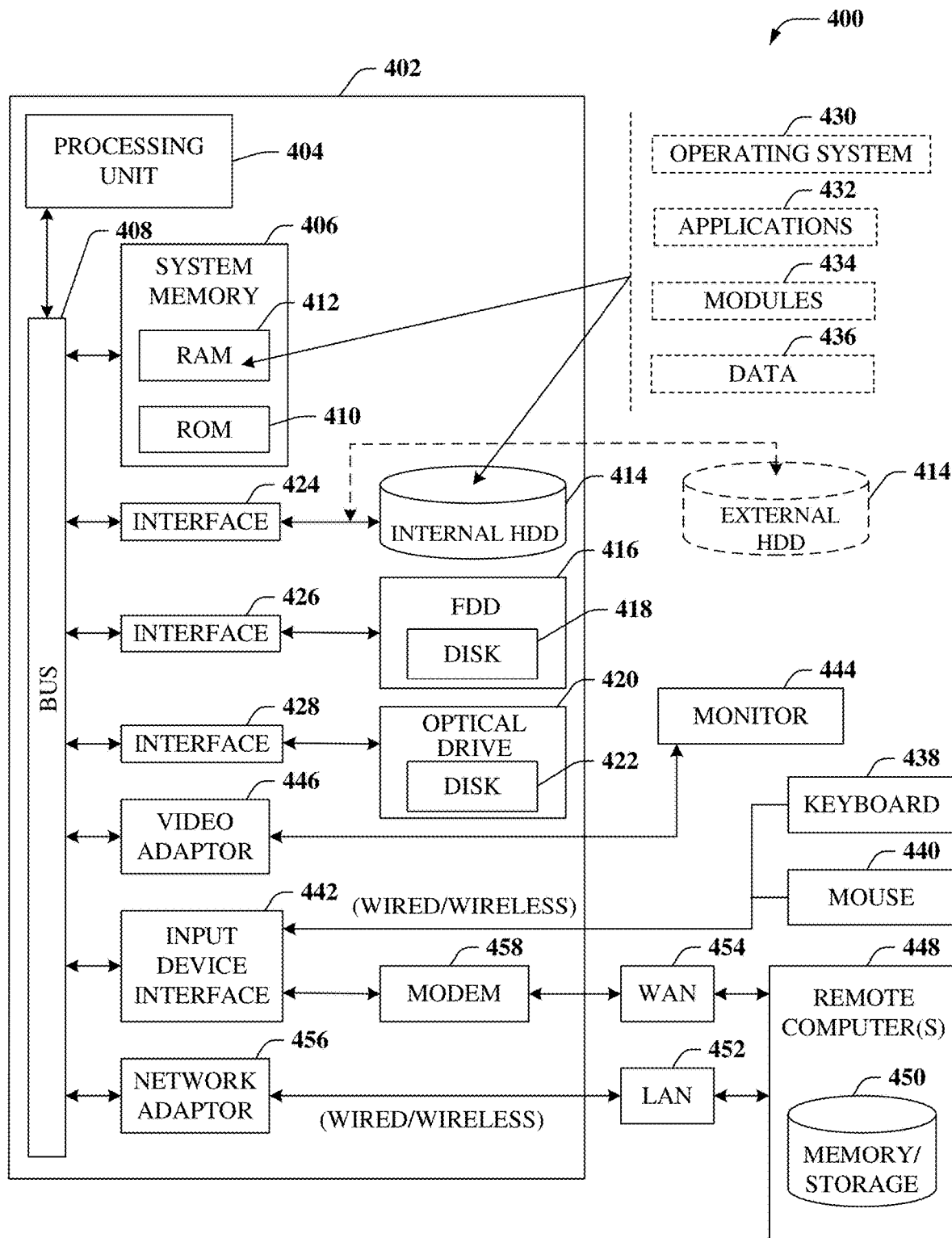
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, resource allocation for different RATs in a DSS deployment based on weighted traffic load measurements.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
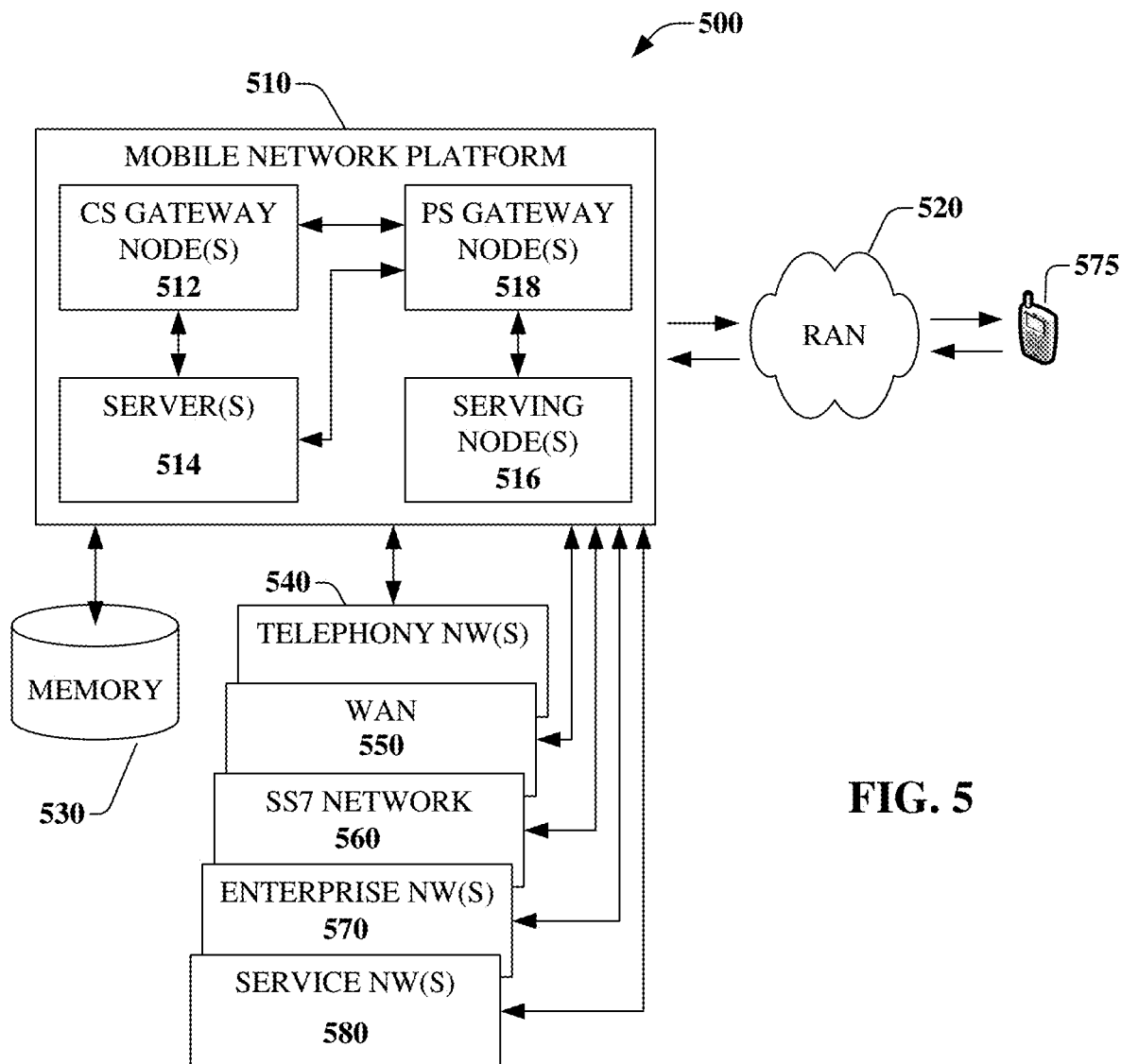
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, resource allocation for different RATs in a DSS deployment based on weighted traffic load measurements. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
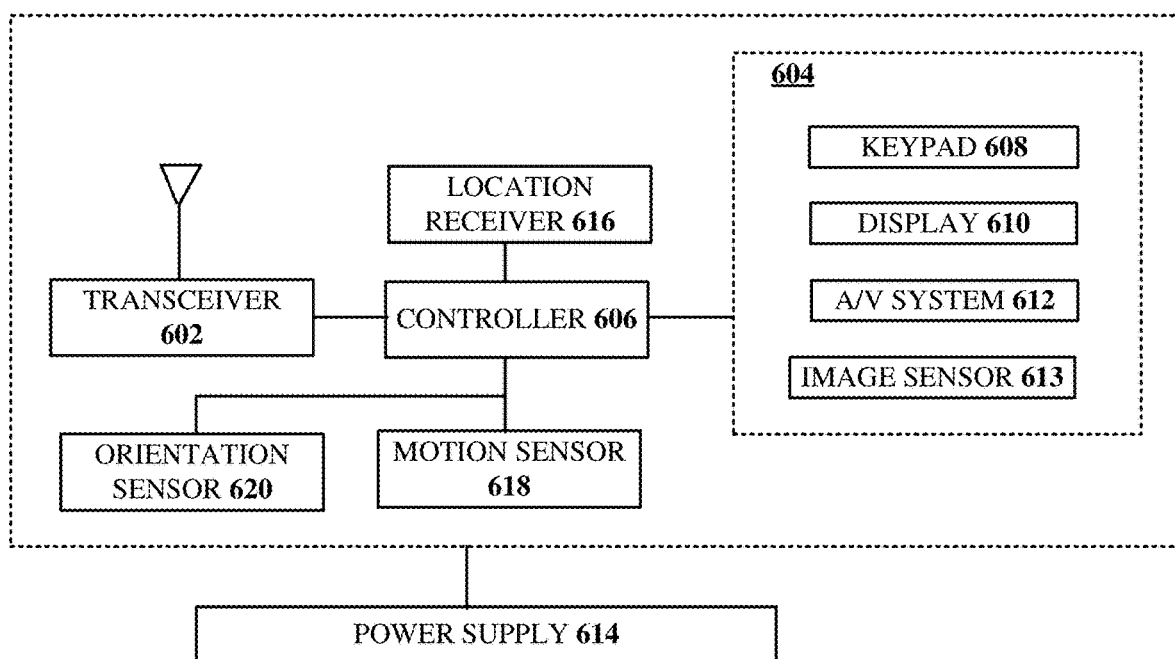
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate, in whole or in part, resource allocation for different RATs in a DSS deployment based on weighted traffic load measurements.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system of a communications network including a processor, wherein the communications network employs a first radio access technology (RAT) and a second RAT and is configured with dynamic spectrum sharing (DSS) such that first traffic relating to the first RAT and second traffic relating to the second RAT share a particular spectrum, wherein the first RAT is associated with a first set of quality-of-service (QoS) levels, and wherein the second RAT is associated with a second set of QoS levels; and
    a memory that stores executable instructions that, when executed by the processing system, facilitate performance of operations, the operations comprising:
    obtaining a first set of traffic load measurements associated with current traffic relating to the first RAT and a second set of traffic load measurements associated with current traffic relating to the second RAT;
    responsive to the obtaining the first set of traffic load measurements and the second set of traffic load measurements, determining a respective weighted traffic load for each QoS level in the first set of QoS levels and the second set of QoS levels;
    based on the determining, deriving a resource allocation ratio for the first RAT and the second RAT; and
    performing a resource allocation in accordance with the resource allocation ratio to enable relative scheduling weights assigned to the QoS levels in the first set of QoS levels and the second set of QoS levels to be reflected in the first traffic and the second traffic over the particular spectrum.

2. The device of claim 1, wherein a first QoS level in the first set of QoS levels is assigned a first relative scheduling weight, wherein a second QoS level in the second set of QoS levels is assigned a second relative scheduling weight that is lower than the first relative scheduling weight, wherein the performing the resource allocation ensures that a first traffic throughput associated with the first QoS level is higher than a second traffic throughput associated with the second QoS level if all other conditions are the same, and wherein the other conditions relate to radio frequency (RF) conditions, traffic profiles, device types, or a combination thereof.

3. The device of claim 1, wherein the determining the respective weighted traffic load for each QoS level in the first set of QoS levels and the second set of QoS levels is based on a relative scheduling weight that is assigned to that QoS level.

4. The device of claim 3, wherein the resource allocation ratio comprises a first sum of the respective weighted traffic loads for the QoS levels in the first set of QoS levels relative to a second sum of the respective weighted traffic loads for the QoS levels in the second set of QoS levels.

5. The device of claim 1, wherein each of the first set of QoS levels and the second set of QoS levels comprises non-Guaranteed Bit Rate (non-GBR) QoS levels and excludes GBR QoS levels.

6. The device of claim 1, wherein the first set of traffic load measurements comprises a respective traffic load measurement for each QoS level in the first set of QoS levels.

7. The device of claim 6, wherein the second set of traffic load measurements comprises a respective traffic load measurement for each QoS level in the second set of QoS levels.

8. The device of claim 1, wherein the obtaining comprises obtaining the first set of traffic load measurements from a first relative scheduler associated with the first RAT and the second set of traffic load measurements from a second relative scheduler associated with the second RAT.

9. The device of claim 1, wherein the first RAT comprises 4G Long Term Evolution (LTE) technology, and wherein the first set of QoS levels comprises QoS Class Identifiers (QCIs).

10. The device of claim 9, wherein the second RAT comprises 5G New Radio (NR) technology, and wherein the second set of QoS levels comprises 5G QoS Identifiers (5QIs).

11. A non-transitory machine-readable medium, comprising executable instructions that, when executed by a processing system associated with a first radio access technology (RAT) employed by a communications network including a processor, facilitate performance of operations, the operations comprising:
    obtaining a first set of traffic load measurements associated with the first RAT, wherein the communications network employs a second RAT and is configured with dynamic spectrum sharing (DSS) such that first traffic associated with the first RAT and second traffic associated with the second RAT share a DSS band, wherein the first RAT is associated with a first plurality of quality-of-service (QoS) levels, wherein the second RAT is associated with a second plurality of QoS levels, and wherein QoS levels of the first plurality of QoS levels and the second plurality of QoS levels are assigned respective scheduling weights;
    providing the first set of traffic load measurements to a resource allocation platform to enable the resource allocation platform to determine a respective weighted traffic load for each QoS level of the first plurality of QoS levels and to derive a resource allocation ratio for the first RAT and the second RAT based at least in part on the respective weighted traffic load for each QoS level of the first plurality of QoS levels;

responsive to the providing the first set of traffic load measurements to the resource allocation platform, receiving a particular allocation of resources from the resource allocation platform, wherein the particular allocation of resources is determined based on the resource allocation ratio for the first RAT and the second RAT; and sub-allocating the particular allocation of resources to bearer traffic associated with the first plurality of QoS levels.

12. The non-transitory machine-readable medium of claim 11, wherein the particular allocation of resources, determined based on the resource allocation ratio for the first RAT and the second RAT, enables service differentiation between the first RAT and the second RAT.

13. The non-transitory machine-readable medium of claim 11, wherein each of the first plurality of QoS levels and the second plurality of QoS levels comprises non-Guaranteed Bit Rate (non-GBR) QoS levels and excludes GBR QoS levels.

14. The non-transitory machine-readable medium of claim 11, wherein the resource allocation platform is implemented in a first network node associated with the first RAT, a second network node associated with the second RAT, a computing device distinct from the first network node and the second network node, or a combination thereof.

15. The non-transitory machine-readable medium of claim 11, wherein the first RAT is different from the second RAT.

16. A method, comprising:

receiving, by a processing system including a processor, and from a first network node relating to a first radio access technology (RAT) of a communications network, a first set of traffic load measurements associated with first traffic relating to the first RAT, wherein the first RAT is associated with a first set of non-Guaranteed Bit Rate (non-GBR) quality-of-service (QoS) levels;

receiving, by the processing system, and from a second network node relating to a second RAT of the communications network, a second set of traffic load measurements associated with second traffic relating to the second RAT, wherein the communications network is configured with dynamic spectrum sharing (DSS) such that the first traffic and the second traffic share a radio frequency (RF) spectrum, and wherein the second RAT is associated with a second set of non-GBR QoS levels;

responsive to the receiving the first set of traffic load measurements and the receiving the second set of traffic load measurements, calculating, by the processing system, a respective weighted traffic load for each non-GBR QoS level in the first set of non-GBR QoS levels and the second set of non-GBR QoS levels;

determining, by the processing system, a resource allocation ratio for the first RAT and the second RAT based on the calculating; and allocating, by the processing system, resources of the communications network in accordance with the resource allocation ratio to enable first throughputs associated with the first traffic and second throughputs associated with the second traffic to remain proportional to relative scheduling weights associated with the non-GBR QoS levels in the first set of non-GBR QoS levels and the second set of non-GBR QoS levels.

17. The method of claim 16, wherein a first non-GBR QoS level in the first set of non-GBR QoS levels is assigned a first relative scheduling weight, wherein a second non-GBR QoS level in the second set of non-GBR QoS levels is assigned a second relative scheduling weight that is higher than the first relative scheduling weight, and wherein the allocating the resources of the communications network ensures that a first traffic throughput associated with the first non-GBR QoS level is not higher than a second traffic throughput associated with the second non-GBR QoS level.

18. The method of claim 16, wherein the allocating the resources of the communications network is conducted responsive to identifying congestion in the communications network.

19. The method of claim 16, wherein the first RAT comprises 4G Long Term Evolution (LTE) technology, and wherein the first set of non-GBR QoS levels comprises non-GBR QoS Class Identifiers (QCIs).

20. The method of claim 19, wherein the second RAT comprises 5G New Radio (NR) technology, and wherein the second set of non-GBR QoS levels comprises non-GBR 5G QoS Identifiers (5QIs).

* * * * *